United States Patent
Czajkowski et al.

(10) Patent No.: US 7,261,962 B1
(45) Date of Patent: Aug. 28, 2007

(54) VARIABLE FUEL CELL POWER SYSTEM FOR GENERATING ELECTRICAL POWER

(75) Inventors: Kathleen A. Czajkowski, South Lyon, MI (US); Stephen R. Rebain, Northville, MI (US)

(73) Assignee: Convergence LLC, Brighton, MI (US)

( * ) Notice: Subject to any disclaimer, the term of this patent is extended or adjusted under 35 U.S.C. 154(b) by 578 days.

(21) Appl. No.: 10/247,067

(22) Filed: Sep. 19, 2002

Related U.S. Application Data (62) Division of application No. 09/541,996, filed on Apr. 3, 2000, now Pat. No. 6,503,649.

(51) Int. Cl.
  H01M 8/04 (2006.01)
  H01M 8/00 (2006.01)
  G01R 21/00 (2006.01)
  G01R 21/06 (2006.01)
  G01R 25/00 (2006.01)

(52) U.S. Cl. ............... 429/23; 429/22; 429/12; 429/13; 702/22; 702/60; 702/65

(58) Field of Classification Search ............ 429/23, 429/22, 12, 13; 702/22, 60, 65
See application file for complete search history.

(56) References Cited

U.S. PATENT DOCUMENTS

| | | |
|---|---|---|
| 3,621,365 A | 11/1971 | Beck et al. |
| 3,653,969 A | 4/1972 | Titterington et al. |
| 4,104,539 A | 8/1978 | Hase |

(Continued)

FOREIGN PATENT DOCUMENTS

JP  10228919 A  8/1998

OTHER PUBLICATIONS

"Innovative Design, Low-Cost Materials are Key to Avista's 720 Residential Fuel Cell," Hydrogen & Fuel Cell Letter, Dec. 1998.

(Continued)

*Primary Examiner*—Raymond Alejandro
*Assistant Examiner*—Angela J. Martin (57) ABSTRACT

The present invention provides an apparatus and methods for variably supplying power from a stand-alone fuel cell power supply system including a power conversion unit, a power switching unit and a load control unit. Preferably, a controller manages system configuration to switch the loads, the power conversion and the delivery between the two without reducing capacity by redundantly backing up each individual portion with a bank of at least two modules for each unit. Preferably, controller actuated devices are triggered automatically in response to monitors that sense performance operating parameters and detect values operating outside a threshold range. Preferably, each of the units and the components in each unit are banked in a plurality of modular units so that individual converters may be interchanged, individual fuel cells may be interchanged, individual controllers may be interchanged, and individual storage units such as batteries may be interchanged to ensure proper operation of each bank despite changes or failures in individual components of the bank. The power system may include couplers for connecting the system to dedicated outlets such as an NEC standard 120/240 volt building circuitry. The invention monitors multiple elements from fuel supply, fuel cells, converters, storage units, and controls as well as the loads for balanced, reliably robust, high power quality, and independent power supply.

2 Claims, 4 Drawing Sheets

U.S. PATENT DOCUMENTS

| | | | |
|---|---|---|---|
| 4,384,213 A | | 5/1983 | Bogel |
| 4,441,032 A | | 4/1984 | Sakurai et al. |
| 4,472,641 A | | 9/1984 | Dickey et al. |
| 4,670,702 A | | 6/1987 | Yamada et al. |
| 4,677,037 A | | 6/1987 | Takabayashi |
| 4,839,574 A | * | 6/1989 | Takabayashi ............... 320/101 |
| 5,156,928 A | * | 10/1992 | Takabayashi ................ 429/23 |
| 5,290,641 A | | 3/1994 | Harashima |
| 5,360,679 A | | 11/1994 | Buswell et al. |
| 5,462,815 A | | 10/1995 | Horiuchi |
| 5,625,546 A | | 4/1997 | Schaal |
| 5,637,414 A | | 6/1997 | Inoue et al. |
| 5,642,275 A | | 6/1997 | Peng et al. |
| 5,646,459 A | | 7/1997 | Hatate et al. |
| 5,712,052 A | | 1/1998 | Kawatsu |
| 5,725,964 A | | 3/1998 | Huppmann |
| 5,853,910 A | | 12/1998 | Tomioka et al. |
| 5,858,568 A | | 1/1999 | Hsu et al. |
| 5,885,727 A | | 3/1999 | Kawatsu |
| 5,945,232 A | | 8/1999 | Ernst et al. |
| 6,030,718 A | | 2/2000 | Fuglevand et al. |
| 6,218,035 B1 | | 4/2001 | Fuglevand et al. |
| 6,219,623 B1 | | 4/2001 | Wills |

OTHER PUBLICATIONS

Blomen & Mugerwa, Characteristics Of Fuel Cell Systems, Chapter by AJ Appleby, pp. 184-193, 1993.
SFCCG, Inc., Market Opportunity Notice (MON) For Market-Derived Residential Fuel Cell Systems, Apr. 1997.
PC Catalog Ad, 1 pg.
V. Biancomano, "N+1 UPS Offers Redundancy," EE Times, 1998.
J. Berger, "Charging Ahead," 1998.
F. Barbir, "Technical Challenges In PEM Fuel Cell Development," Energy Partners, Inc., pp. 1-6.
D. Swan and M. Miller, "California's Statewide Fuel Cell Research, Design and Development Collaboration Plan," Table 3, 1996.
"Fuel Cell Directory," Spring 1999.
Sure Power Corp. Website, Sure Power High Availability Power Systems: What We Do, 3 pgs.
PK Electronics Web Site, 10 pgs., Jun. 24, 1999.
"PK Electronics Introduces The US9001 Modular Parallel Redundant UPS," 3 pgs., Dec. 5, 1998.
Power Corp., Sure Power—When Failure Is Not An Option, 1 pg.
Pure Power, Electrical Systems For The 21$^{st}$ Century, "Banking On Fuel Cells To Supply Critical Loads," Fall 1998, pp. 18-21.

* cited by examiner

VARIABLE FUEL CELL POWER SYSTEM FOR GENERATING ELECTRICAL POWER

CROSS-REFERENCE TO RELATED APPLICATIONS

This application is a divisional of U.S. application Ser. No. 09/541,996 filed Apr. 3, 2000 now U.S. Pat. No. 6,503,649.

BACKGROUND OF THE INVENTION

1. Field of the Invention

The present invention relates to electrical power supply from a variable fuel cell power supply system for reliably generating ac and dc power as a stand alone unit.

2. Background Art

The availability, defined as percentage of run time over total time; the reliability, determined as the number of occurrences of failure per unit time of operation; and the durability, defined as service life, of previously known fuel cell generators are not sufficient for a free-standing, continuously operating, dynamic load-following, local fuel cell application using currently available manufactured components or even improved components.

Previous claims to fuel cell availability, reliability and durability, as reported in newspapers, magazines, and technical journals, are specific to a particular existing or envisioned application. For instance, the durability needs of a fuel cell automobile engine (e.g., 5,000-10,000 hrs) with its intermittent operation may not be acceptable in a residential application with continuous operation (e.g., 45,000-90,000 hrs) requirements. In addition, a fully acceptable 85-90% operating availability for a manned, grid backed, utility site would not be accepted by the general public for a local, unmanned, residential unit (where expectations are more likely to be one loss every 5-10 years). A NASA space fuel cell application using pure stored liquid hydrogen and oxygen cannot be relied upon by skilled artisans to establish how to improve reliability to required levels for a free-standing, re-formed fuel, ambient-air terrestrial application, particularly under dynamic and transient operation.

Improvement efforts focus on components rather than systems to solve availability, reliability, durability, and excessive cost problems. A non-exhaustive list of specific Proton Exchange Membrane (PEM) fuel cell problems currently under attack include: carbon monoxide/dioxide catalyst poisoning from reformed hydrocarbon fuels, membrane hydration control for dimensional stability and ionic conductivity, membrane physical integrity for pressure differential and expansion or contraction stress failures, membrane dehydration and electronic failures caused by hot spots from poor heat dissipation, and fuel cell contamination caused by incomplete fuel reforming and/or cleanup. Most fuel cell problems are accentuated by operational dynamics and/or transients. Conventional wisdom demands that systems must shutdown processes in the event of hydrogen leakage. In addition, manufacturing process variability for membranes, electrodes, and Membrane Electrode Assemblies (MEA's) result in a lack of consistency or repeatability in performance (or operation) for assembled fuel cell stacks.

In an attempt to solve these problems, previous research and development efforts have focused on components. New materials for membranes, bipolar plates, catalysts, composites, and electrodes have been developed. Geometry changes, including stacked plates, round, hexagonal, and others have been tried with varying success. Improvements by studying the chemistry of contamination, chemical process stability, chemical degradation, chemical depletion, and alternative chemistries, have been sought. New processes for manufacturing components have focused on cost reduction, tolerances, and uniformity. Improvements in operational safety and the effectiveness of system monitoring and control have been sought through the development of controllers and sensors that possess integrity during variations in pressure, temperature, and humidification. The need to use fossil fuels, because of the lack of a hydrogen distribution infrastructure, has caused development of storage, distribution, reformer, multi-fuel reformer, and contaminant clean-up equipment. Finally, improvements in ancillary fuel cell generator components such as energy storage units, electrical converters, compressors, pumps, and manifolds have been tried with varying success.

There are also conflicting issues that require different trade-offs for different applications. Previously known improvements, such as thinning membranes to increase conductivity and fuel cell power density, reduces reliability by compromising physical integrity. Membranes expand and contract as much as 20% between their dehydrated and fully hydrated states, creating opportunities for physical failure due to stress, strain, creep and tear. In addition, gas pressure differentials across the membrane are more likely to cause membrane punctures. When reducing membrane dimension, membrane thickness and uniformity becomes more difficult to control. Lightened catalyst loading decreases cost and reduces durability due to increased susceptibility to catalyst poisoning from fuel or oxidant impurities.

In addition to the fuel cell stack issues, the remaining plant devices also contribute to the operational, reliability, and durability problems. For example, inverter failures have significantly reduced the availability and durability of prototype fuel cell generators and commercial Uninterruptible Power Supply (UPS) installations. Both single fuel and multi-fuel reformers, using commonly available fuels, are still in the R&D stage for attaining hydrogen-rich and contaminate-free operation, particularly under transient conditions. Batteries have well known duty cycle and durability issues that have led researchers in the field toward storage alternatives such as ultra capacitors and fly wheels.

Virtually all major automotive manufacturers are targeting 2004 for the introduction of commercial Proton Exchange Membrane fuel cell engines of a size that outputs approximately 50 kW. Fuel cells become cost-competitive with the internal combustion engine at approximately $35-$50 per kW. A large scale phosphoric acid fuel cell (PAFC) stationary commercial supply system is produced by ONSI, the PC25; and Ballard Power Systems has demonstrated a 250 kW PEM prototype. The target market for these products are utilities, industries, hospitals, and commercial establishments because of their size. A small scale stationary/residential system has not yet been commercialized, although Plug Power has set a residential PEM fuel cell commercialization target of 2001 for a supply output size of approximately 7 kW, while APC, Avista, Energy Partners, H-Power, and NPS have all stated intentions to enter this market. Fuel cell generators become cost-competitive at approximately $500-$900 per kW in this market.

Fuel cell developers are looking for synergy between the transportation/automotive and stationary product markets. However, the previous developments do not establish that improvements and cost reductions will always be directly transferable between products/markets. Auto manufacturers, suppliers and their strategic partners are addressing problems through research and development at the component level and through the simplification of systems by component reduction, however, transportation application requirements allow tradeoffs that are detrimental to stationary applications.

Large stationary fuel cell system developers are accepting the low reliability specifications of existing utility generating equipment. The exception is a developer (SurePower) who is targeting high-value power quality with the application of ONSI Corporation's 200 kW PC25 units. However, the SurePower approach relies upon rotary equipment as well as grid connection and generators to compensate for fuel cell production inconsistencies during dynamic and transient load changes. Some small Stationary/Residential system developers including some fuel cell suppliers and their strategic partners appear to be addressing reliability and durability problems with a grid interface for alternate supply where the grid becomes an energy storage buffer and backup for the fuel cell.

Fuel cell technology is generally touted for reliability because there are no moving parts and availability exceeds that experienced for the most reliable utility generators. However, the current state-of-the-art fuel cell generator falls short of the needs for stationary free-standing and/or high power quality markets. The ancillary equipment needed to support the fuel cell in an environment with no hydrogen fuel distribution infrastructure, and a need to convert the dc output to ac for most applications, adds complexity and additional failure modes that reduce availability significantly. Most components are not market mature (reformers, sensors, controls, membranes, etc.) and their reliability is unproven. Where ancillary equipment is mature (inverters, batteries) the devices are not known for their reliability and durability and do not provide for secure, unattended operation.

Much of the current research and development effort is targeted at improved fuel cell materials, catalysts, and fuel cleanup all driven by reduced cost targets. However, many of the cost reduction efforts have potentially degrading effects on the fuel cell reliability, availability, and durability experienced to date. The use of thinner fuel cell membranes reduces cost and weight while sacrificing physical strength and integrity. Lower catalytic loadings reduce costs while increasing the risk of catalyst poisoning and perhaps reducing durability. New materials in bi-polar plates reduce costs but may degrade operating characteristics and conductivity. New materials and the processes producing them could introduce impurities that would detrimentally affect the long term stability of the fuel cell's chemical reactions. Even the strongest supporters of fuel cells acknowledge the performance risks associated with taking this technology to market at a competitive price.

In a commercial utility grid, the interconnected grid is divided into control areas and each area is the assigned responsibility of a specific utility. The control strategy uses the mechanical inertia of rotating electrical equipment, generator governors set at 60 cycles, and supplemental generator control (using unloaded spinning reserve), to maintain the area control error (ACE) and grid frequency within specified ranges under normal dynamic loading conditions. In simplified form, ACE equals the difference between the area's load and the sum of the area's generation plus purchase power contracts minus its sales contracts. A non-zero ACE indicates an unbalance in the load and supply. For supply deficiency, a signal derived from ACE is used to load spinning reserve, and for supply excess, the ACE signal is used to unload generation. The inertia of rotating equipment is used to buffer the system with rotational frequency rising above 60 cycles when supply exceeds demand and frequency declining below 60 cycles when demand exceeds supply—thereby achieving a new energy balance between supply and load at the new frequency. An uncontrolled unbalance in grid supply and demand (an unstable condition) would cause widespread physical damage when rotating equipment is forced to operate outside the rotational speed design parameters (typically 57-62 cycles). These controls are not readily applicable to a fuel cell stand alone power supply.

SUMMARY OF THE INVENTION

In light of a moving and hidden, often proprietary, reference from which to establish the reliability, availability, and durability of an integrated commercial product, the present invention overcomes the above-mentioned disadvantages by providing a variable system design to allow the "tailoring" of the product to attain the appropriate balance of reliability, availability, durability, operational stability, and cost that will create a robust, stand-alone, small-scale product capable of handling transient conditions and particularly adapted to satisfy the residential consumer without rotary equipment buffering from an outside power source.

As used in the disclosure, a free-standing local generation system means a variable fuel cell power supply system that simulates the power reliability of a power grid, but generated within the physical boundaries of a service zone such as a local residence, building, or plant. The stand alone system of the present invention includes redundancy that replaces the multi-feed network of the commercial power grid, to provide a robust power source that maintains the required energy balance within this new, smaller, network as transient conditions occur. The present invention provides a free-standing commercial non-rotating generation system, with no mechanical inertia, that meets the requirements of the residential customer for availability, reliability and durability because adaptive controls, switchable redundant capacities, and switchable loads mitigate the problems caused by imbalances and partial system failures.

Commercial free-standing generators using rotating prime mover systems, have, at best, 80-90% availability, and are intended for grid backup or intermittent use. In all well-designed equipment according to conventional wisdom, excessive or prolonged energy unbalances are either absorbed by controlled heat dissipation or are protected against by over-temperature, under-temperature, over-speed, under-speed, overload, or short circuit detections and the conventional response is to force equipment shutdown for safety and damage protection. Complete interruption of service is not necessary to mitigate problems outside the range of the invention's adaptive controls because individual loads or load combinations can be switched off or thrown over to return the system to a state where the adaptive control regains effectiveness and only a partial interruption occurs, thereby improving availability. Furthermore, the adaptive control system will allow the customer to determine load priorities so that the least essential loads are considered first for interruption. Thus, the present invention compensates for variability, with adaptive control of system functions including the activation or deactivation of power supply modules and the switching or throw-over of load circuits.

In addition, although inverters have been used in uninterruptable power supply (UPS), electronic clean power, alternative energy, and renewable energy systems, the essence of these systems is to couple storage equipment and non-continuous supply sources to the grid in such a way as to produce a more continuous supply. For example, the PK Electronics application is a UPS targeted at local/personal computer systems and local computer network loads smaller than 16 kVA at 120 vac. The Sure Power System is a high-availability system implemented in "switchgear" modules using the ONSI Corporation 200 kW PC25 phosphoric acid fuel cell and rotary equipment for mechanical inertia (flywheels). Such improvements have not dealt with the interface of fuel cell technologies and their problems in a free-standing residential generation system. Reliability problems with inverters as well as other components have spawned designs needed by computer and other power sensitive processes that are not readily adapted to a free-standing, variable fuel cell power generation system.

The controller preferably includes logic in this adaptive control that may be used to extend the "apparent" life of the components by managing their activation and deactivation so that load-life burdens for similar components or cells may be equalized. Furthermore, load-life burdens for dissimilar service rating components or fuel cell chemistries can be apportioned to extend the overall life expectancy of the system.

BRIEF DESCRIPTION OF THE DRAWINGS

The present invention will be more clearly understood by reference to the following detailed description of a preferred embodiment when read in conjunction with the accompanying drawings in which like reference characters refer to like parts throughout the views and in which.

DETAILED DESCRIPTION OF THE PREFERRED EMBODIMENT(S)

The present invention provides a variable fuel cell power system (VFCPS) 10 in several embodiments for an adaptive design of a stand alone supply system that reconfigures itself into a viable supply system under numerous contingencies so that points of failure do not incapacitate supply output. The system selectively adjusts to a customer's priorities for service continuity when a reduction of supply capacity is experienced or is selected by adaptive adjustments. The flexibility of the design allows selection of the degree of redundancy, selection of the overall capacity, resizing for increased usage, and selection of the reliability or availability desired. The ability to retrofit and resize in the field protect the purchaser's investment and increases the likelihood of early commercial adoption of the technology. The modularity and scalability is applied to fuel cells, inverters, converters, reformers, and storage systems to improve reliability and availability, without any major increase in capital cost over non-modular designs, and to improve maintenance effectiveness and cost. Due to the scalability of the fuel cell, inverter, reformer, and storage components, where scalability is exemplified when costs are approximately proportioned to size, the modularizing and adaptive control networking in this invention reduces capital cost burden. This is unlike other generation systems such as utility turbogenerators that have capital cost economies of scale. Furthermore, the rapid startup of proton exchange membrane (PEM) fuel cells may be relied upon to allow nearly total shutdown when there is no load, and provides a significant advantage over the startup and no-load costs experienced by other generation system alternatives.

Figure 1:
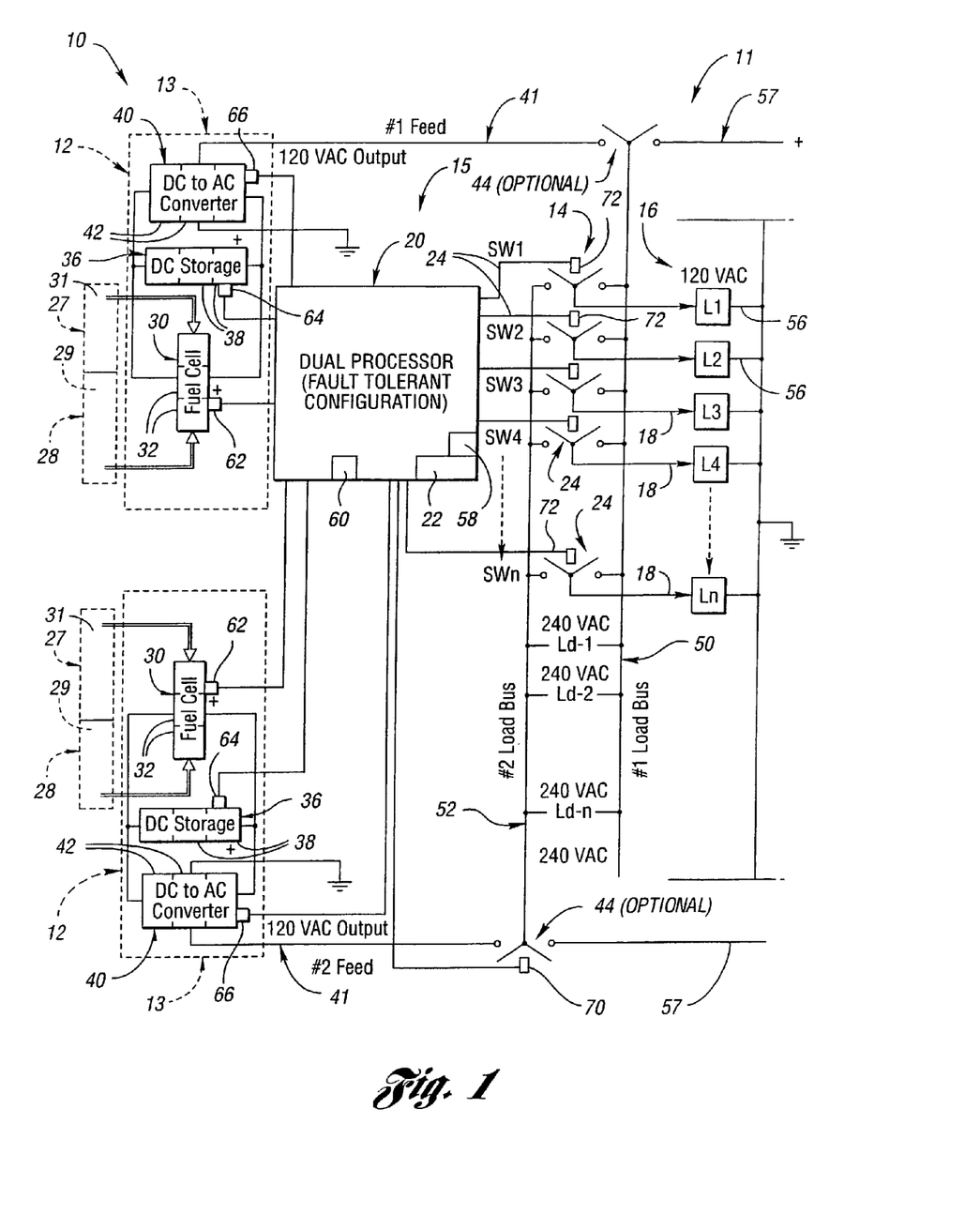
FIG. 1 is a schematic view of a fuel cell power supply system constructed according to the present invention.

Referring first to FIG. 1, a supply system 10 according to the present invention provides an output 11. Preferably the output 11 is a 120/240 vac output to match a house wiring standard, although the output may also include dc as well as ac currents at selected voltages to operate particular loads, for example, computer system boards, as required for the stand alone facility to be powered by the system 10. A control 15 fully integrates all elements of the fuel processing, electrical generation and power delivery to a plurality of loads coupled on the output 11. The control 15 includes a switch bank 14 having a plurality of feeds 16 switchable to a plurality of loads to maximize continuity of service. Preferably, other components in addition to the feeds 16 are banked to increase reliability and reduce costs, and subsystems are configured in at least (n+1) configurations, where (n) is the number of necessary subsystems to meet the specified operating capacity, availability, reliability and durability desires of the customer and (n+1) provides a spare subsystem.

In the preferred embodiment, the control 15 includes a controller 20 having a clock generating an integrated time standard to avoid reliance upon a utility grid 60-cycle time reference that a grid provides at each user location. The elimination of a utility interface connection will remove the need for interface components with their attendant failure modes and also isolate the variable fuel cell power supply from damaging transients, harmonics, and lightning-induced damage originating on the utility grid. The controller 20 may be an integrated master control module 22 or a network combining distributed processors, for sensing and controlling localized functions, with a link, for example, a common processor, that orders the priority and response hierarchy to the distributed processing. Nevertheless, the illustrated embodiments show a controller 20, preferably comprising redundant controllers 22, to link the numerous sensors, actuators and distributed controllers that may be integrated with such devices to provide a plurality of system configurations, for operating the power supply system as a stand alone unit, although the controller 20 is not so limited.

The energy storage system 36 may be made of a plurality of storage cells, each of which may be a battery, ultracapacitor, or preferably, a regenerative fuel cell. The storage system 36 buffers out load-induced transients and surges or deficits from the fuel cell unit 30 and fuel-flow system 28 allowing the control system 15 to gradually change fuel flows and decrease reformed fuel contamination and fuel cell stresses. The output 11 can provide both ac and dc electrical current output through outputs from converter system 40, which may include a plurality of converters 42 including dc-ac as well as dc-dc voltage converters, to eliminate the need for dedicated but inefficient ac-dc power supplies in appliances and in other electronic equipment loads to be operated by the system.

As a result, the present invention provides variable redundancy, banking, adaptive controls, modularity, and scalability features in the variable fuel cell power supply including combinations needed for a free-standing electrical power generator with components of varying design and production maturity to be reliable. The variable fuel cell power supply design allows the tuning and optimization of the product to meet customer requirements of reliability, durability, and maintainability despite the constraints of supplied components and variability in the operation of the components. The variable fuel cell power system can be retrofitted and resized in the field, preferably using predetermined compatible plug-in modules and non-interrupting service procedures by installing expansion modules in spare positions and by hot-swapping failed modules to restore (n+1) spare operation. Sensors to detect this activity or control panel input will appropriately adjust the control algorithms.

Referring again to FIG. 1, a variable fuel cell power supply system 10 is shown in a particular embodiment including at least two power conversion units 12 coupled to the switch bank 14. A load bank 16, providing at least two ac power outlets 18, up to N number of outlets 18 wherein N=the number of necessary outlets 18 for a particular application. In FIG. 1, the output 11 includes a plurality of load circuits 56 for a building or other facility. In this and the other embodiments, each output subsystem 12, 14, and 16 includes appropriate sensor inputs for subsystem components, for example, for fuel parameters, electrical parameters, temperature, water and gas management for start-up, synchronization, and dynamic operation.

Such sensors may be integrated with distributed processor controllers, for example, as shown in FIG. 1, at any of 27, 28, 18, 62, 64, 66, 70, 72, and 56, particularly where monitoring is necessary or the like for proper operation or compliance with regulations applicable to electrical power supply, building codes, or the like. For example, feedback from fuel cell controller 62 may provide one or more signals as a response to monitoring a plurality of conditions, such as, fuel flow rate, temperature, impurity detection, leak detection, fuel volume and others at stations such as fuel systems 28, air supply systems 27, fuel cell stacks 32, and reformers 29. Similarly, regulatory codes and standards for fusing, venting, and the like that are incorporated in each of the subsystems shown, such as power conversion units 12 including sensor 64 at storage units 36 and converter controller 66 at 40, switch bank 14, feeds to load bank 16, utility throwover switch controller 70, load throwover switch bank controller 72 and load sensors at 56.

Preferably, at least two sources of control, such as two control modules 22 form a variable fuel cell power supply system controller 20 for integrating the selected operations between power conversion units 12 in bank 13, the switch bank 14 and the load bank 16. Both manual control and automated control may be represented by the controller 20 although in the preferred embodiment, a single computer processor 22, preferably backed up by a redundant processor 22, may manage the sensing, threshold comparison, and switch manipulation as will be described in greater detail below.

The loads and feeds 16 are monitored to allow automatic or alternatively, manual control, at each switch 24 in the bank 14 to match customer selected load priorities and to prevent overloads under abnormal operating conditions. Likewise, monitoring of load circuits and feeds will support predictive and preventive maintenance and record performance parameters so that reliability and durability are improved over previously known residential power supply systems.

As shown in FIG. 1, each power conversion unit 12 includes a fuel cell 30 including one or more fuel cell stacks 32, preferably made up of proton exchange membrane (PEM) cells. Alternatively, solid oxide, molten carbonate, phosphoric acid, alkaline, zinc oxide, or other fuel cell chemistries may be employed in a fuel cell 30. In the preferred embodiment, each fuel cell 30 is fed hydrogen-rich reformate from common or modular reformers 29, preferably multi-fuel micro-channel reformers. However, hydrogen may also be provided from banked reformers, tanks, metal hydride or other sources alternative to the reformer 29 at source 28. In addition, the fuel cell 30 is fed ambient air oxygen for the fuel cell's oxidant from the source 27, preferably ambient air fed through a filter 31. The independent fuel cells are also coupled to separate modular dc energy storage devices 36, preferably a plurality of regenerative fuel cells 38, or other storage devices as previously described. The plurality of storage devices 38 provide transient energy buffering and dynamic load following to dampen or smooth variable production at the fuel cells, and thereby dampen fuel flow transients at the reformer to mitigate reformate contamination.

Each power conversion unit 12 contains at least one independent modular power converter subsystem 40 to provide the desired voltage, current and wave form as a supply output 41. Preferably, converter subsystem 40 comprises a plurality of independent modular converters 42, including dc to ac and dc to dc converters providing both ac and dc outputs. Preferably, a bank formed by a plurality of converters 42 provide a desired voltage current and waveform in a redundant manner so that a plurality of switching devices can connect the converter 40 to a plurality of ac or dc load circuits.

As also shown in FIG. 1, a double bus neutral (three wire) load distribution service panel will connect directly to a standard 120/240 volt National Electric Code wiring standard building wiring system. Two optional switches 44 operate in tandem, to allow manual throw over, or automatic throw over, through switching controls 70, to an outside commercial feed or other electrical supply 57. Switches 24 in the bank 14 provide a manual or automatic throw over of load circuits 56, preferably through automatic switching controls 72, to connect the load circuits 56 to the independent converter 40 outputs 41 connected through the load bus 50 or the load bus 52.

In a preferred embodiment, dual application specific microcomputers 22, which may be configured with power line carrier local communication 58, and remote digital or analog communications 60, are provided to control the steady state, transient and dynamic energy balance of the system. Preferably, controller 20 also includes a synchronizer, for example, clock processor, to synchronize the output of said power conversion units. A preferred processor obtains a signal in compliance with the U.S. Naval Observatory clock time, to regulate the frequency of the output from dc-ac converter 40. An on-line monitoring function of controller 20 can record performance parameters, and the controller 20 is programmed with the logic that prioritizes the load circuits 56 which may receive power when limited capacity has been detected. Controller 20 also activates required switching of the switches 44 and 24. In addition, controller 20 may predict or indicate preventative and reactive maintenance requirements, and may generate and deliver reports both locally and remotely that a threshold value of some performance parameter has been attained at one of the sensors at 62, 64 and 66 for the fuel cell unit 30, the storage unit 36, and the converter unit 40, respectively, that provide useful operating/performance information to the controller 20.

Similarly, distributed controllers may be responsive to the processing logic that is accomplished in the controller 20, such as a controller 70 actuating terminal closure of switches 44 for load busses 50 and 52, respectively, and generating control signals for components of the variable fuel cell power supply system 10, or selecting interaction with the utility feed 57, as permitted by a master controller 22. The controllers 72 may respond to or generate control signals for actuating each of the switches 24 in the bank 14, which similarly may be terminally engaged with load bus 50, or load bus 52 to provide selectable connections to the load bank 16. Preferably, the switches 24 and 44 use break-before-make technology to avoid paralleling the supply system 10 and connector supply 57, to automatically throw over the load busses 50 and 52 to the connector supply 57, or to throw over loads from one load bus to the other (50 to 52 or 52 to 50) without paralleling the system 10 with the connector supply 57 or paralleling load bus 50 with load bus 52.

Although the preferred embodiment has been disclosed as having automated switching control 70 and 72 in response to monitoring of performance parameters and various components, it is to be understood that manual switches may substantially reduce the cost of providing the same capabilities without departing from the present invention and the reliability and robustness of the system due to the redundant capabilities of each portion of the system.

Figure 2:
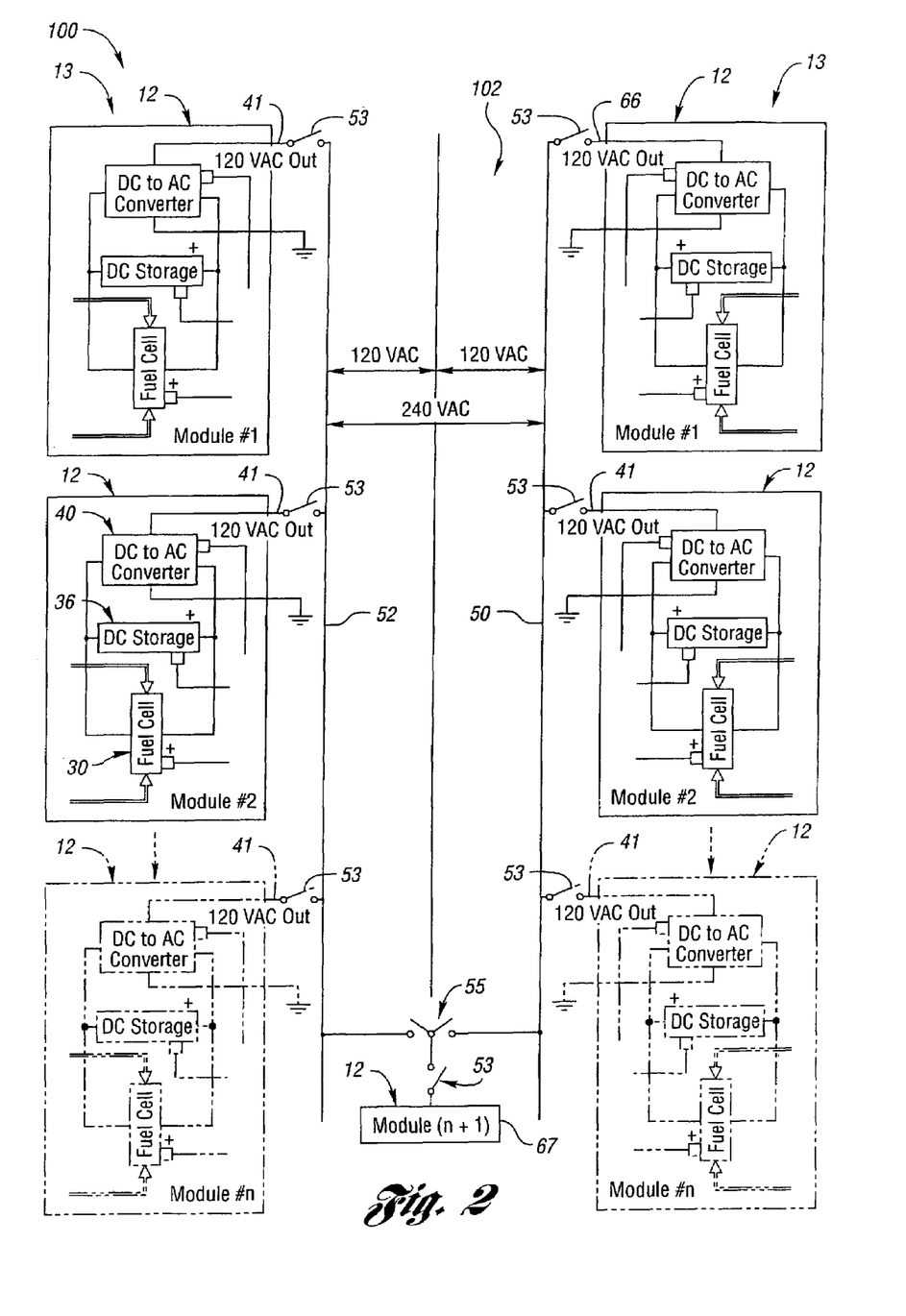
FIG. 2 is a schematic view similar to FIG. 1 but showing a modified layout in accordance with the present invention.

Referring now to FIG. 2, a system 100 for banking power conversion units 12 is shown and is particularly well adapted for modular application of micro-channel reformers where a separate reformer can be provided for each unit 12 and a header fuel supply connected to the reformers. Each power conversion unit 12 in each bank 13 is equipped with a cutoff switch 53 on its output that connects to a bus 50 or 52 for supply circuit 102. The output 41 from each of the conversion units 12 normally feeds bus 50 or 52 of the common three wire 120/240 volt ac residential wiring system. Upon the failure of a power conversion unit 12, controller 20 will automatically disconnect the unit 12 from the common three wire system at cutoff switch 53 and replace it with the spare unit 67 by operating switch 55. The number of modules 12 in banks 13 corresponds at least to the total required capacity of a load bus 50 and 52, plus at least one spare 67. Alternately, at least one of the conversion units 12 may be redundantly backed up by a spare power conversion unit 12 in each bank 13, as depicted in FIG. 2 by phantom line.

Figure 3:
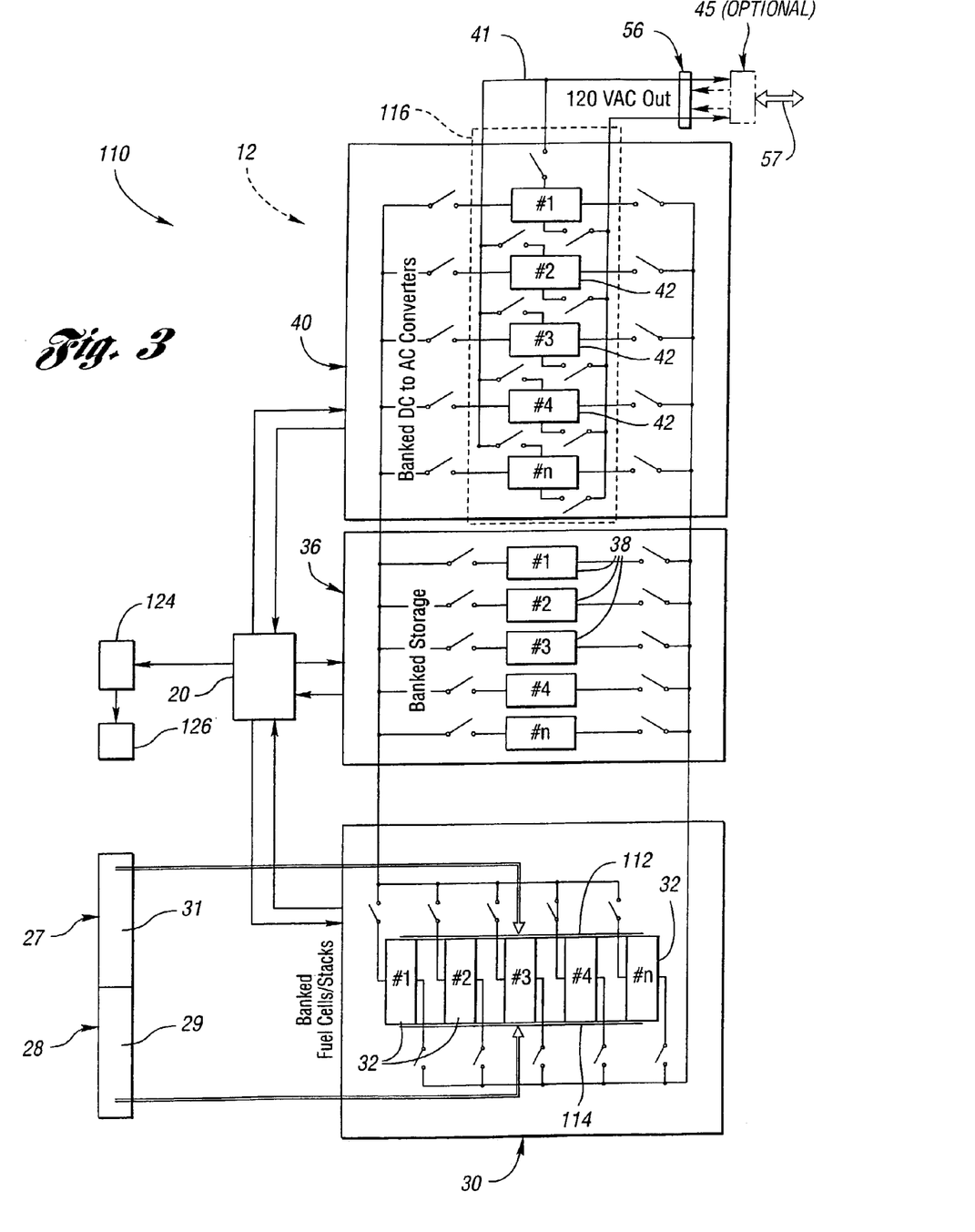
FIG. 3 is a schematic view similar to FIGS. 1 and 2 but showing a modified layout in accordance with the present invention.

Referring now to FIG. 3, a system 110 is shown in which power conversion unit 12 consists of a bank of fuel cell stacks 32 that are coupled through the manifold 112 to a common source of oxygen 27, preferably from filtered 31 ambient air, and a common source of purified hydrogen, preferably from a reformer 29, through the manifold 114. In addition, a plurality of dc storage units 38 are coupled in parallel for controlled switching. Such switching may be in response to operation of the controller 20 or manual switching as previously discussed in order to balance the flow of energy despite changes in the power supply delivered from the power conversion units 12 in the bank 13, as well as to balance changes in the loads being applied at output 56. A bank 116 of dc to ac converters 42 is similarly controlled in response to the controller 20 to maintain and regulate sufficient current despite the changes in the number of loads applied to the output 41, and changes in the buffering storage facility 36 and changes in the operating parameters occurring in each of the fuel cell stacks 32 in the fuel cell unit 30.

The output 41 may optionally be selectively engaged by utility interface 45 and permits the power that remains unused in the building load 56 to be fed into the commercial grid 57. As with the previously discussed modules for power conversion, the interface 45 may be selectively operated automatically in response to parameters monitored by the controller 20, although it is to be understood that it may be manually operated without departing from the present invention. Preferably, the controller 20 includes communication capacity so that remote indications of the operating conditions occurring in numerous stacks, modules, fuel supply and load circuits of the system may be delivered for indicating or analyzing, for example, comparison with a threshold value for the operating parameter, in order to determine whether a fault or overload condition exists. Moreover, the indicator may be provided locally as designated at 124 in FIG. 3, or it may be communicated remotely as shown at 126 in FIG. 3, or both.

Figure 4:
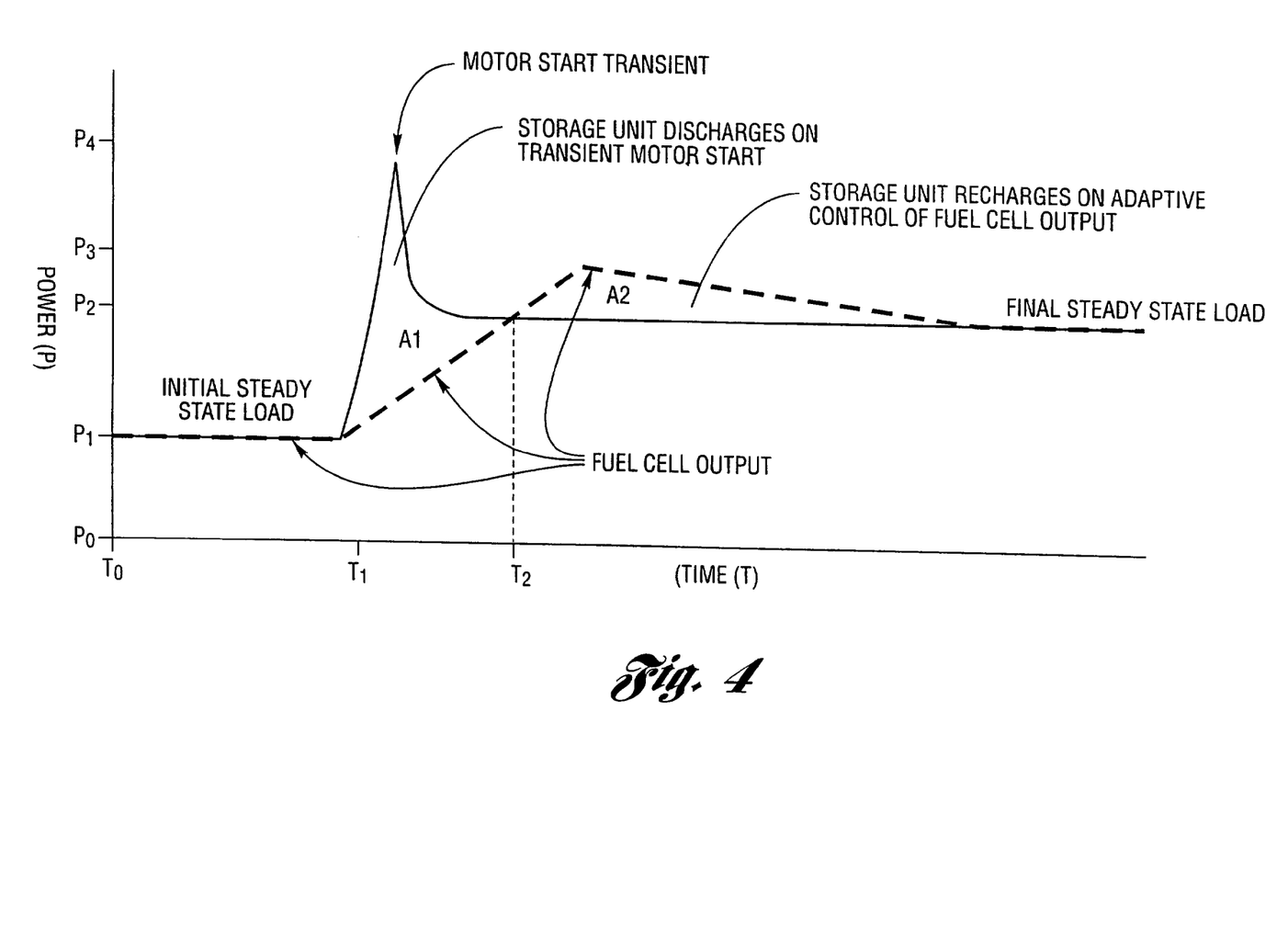
FIG. 4 is a graphic representation of power surge compensation and energy balance provided on a stand-alone system according to the present invention.

A simplified conceptual example of improved VFCPS 10 performance is depicted in FIG. 4 where the transient effect of motor starting is shown to be damped out and the energy balance in the system is maintained through the natural discharge response of the storage unit 36 and the adaptive controller 20 of the fuel cell unit 30 output to supply the new load level and recharge the storage unit 36. A beginning VFCPS steady state load $P_1$ is shown from $T_0$ to $T_1$ when the motor is started causing the inrush rise to $P_4$. The motor starts up and the inrush subsides resulting in steady state operation at $T_2$ with a VFCPS load of $P_2$. Energy area A1 depicts the natural response of the storage unit 36 supplemented by the gradual adaptive controller 20 of the fuel cell 30. This combination damps the severe electrical transient and fuel supply transient that would otherwise occur in the fuel cell system 28,29,30. Minimizing the fuel flow transient reduces the disturbance to the reformer 29 and consequently mitigates contamination, particularly carbon monoxide, in the fuel supply 28 reformat to the fuel cell 30. Energy area A2 depicts the adaptive controller 20 raising the fuel cell 30 output to $P_3$ to recharge the storage unit. The controller 20 then reduces fuel cell 30 output to $P_2$ over time until the storage unit 36 recharges and final steady state VFCPS operation resumes at time $T_4$. Thus, a combination of the natural energy response of subsystems and the supplemental energy control of subsystems are utilized to maintain the transient and dynamic energy balance of the VFCPS.

Referring again to FIGS. 1 and 4, the controller 20 may apply one or more fuel cell stacks 32 using control 62 to gradually load them between times $T_1$ and $T_3$. Likewise, any addition or removal of load by the customer ($L_1 \ldots L_n$), or operation of a load throw-over switch 24 or 44, can have similar transient/dynamic effects, responses, and results. The controller 20 will also use controls 66, 64, 62, 70, 72, with load monitoring sensors to match subsystem supply capability and full system supply capability to the corresponding connected loads. The controller 20 and sensors will also monitor, detect, and isolate defective subsystems 32, 38, 42 when necessary. The controller 20 with a subsystem including a plurality of computers, controls and sensors will be configured as a redundant fault-tolerant system as is common in high reliability data processing applications. A goal of the controller 20, as depicted in FIG. 4, is to transform electrical transients/dynamics and fuel flow transients/dynamics into gradual changes and steady state operation at the fuel cell 30 and at the reformer 29, respectively. Another goal of the controller 20 is to manage the activation and deactivation of individual fuel cell and/or storage modules so that the overall life expectancy of the system may be increased through equalizing accumulated energy output for similar service life cells and apportioning accumulated energy output for dissimilar service life cells of different service lives or different fuel cell chemistries. As a result, the system is operational in a plurality of configurations so as to provide at least a useful supply of electrical power in a fault-tolerant mode. Similar responses may be provided by the other embodiments of the system, for example, load switching configurations, without departing from the scope and spirit of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A variable fuel cell power supply system comprising:
   at least one power conversion unit comprising at least one fuel cell stack fed by at least one reformate source, and at least one energy storage device;
   at least one load bus;
   a switch bank including at least one switch, each switch selectively connecting at least one power conversion unit to said at least one load bus;
   at least one load coupler, each load coupler selectively connecting a load line to said at least one load bus; and
   at least one process control responsive to at least one operating parameter from said at least one load coupler to enhance operation of at least one of said reformate source, said at least one fuel cell stack and said at least one energy storage device to deliver a transient load energy demand, and maintaining an enhanced operation when a load energy demand is reduced below said transient load energy demand to replenish said energy storage devices.

2. The variable fuel cell power supply system as described in claim 1 wherein said energy storage device comprises at least one battery and at least one ultracapacitor connected in parallel, and said ultracapacitor is derated to operate at a partial charge when said battery is fully charged, thereby protecting said battery from deterioration due to supplying said transient load energy demand, and enabling said energy storage device to protect said fuel cell stack and said reformate source from deterioration due to supplying said transient load energy demand.

* * * * *